United States Patent
Liu et al.

(10) Patent No.: US 10,423,294 B2
(45) Date of Patent: Sep. 24, 2019

(54) SYNCHRONIZING A CURSOR FROM A MANAGED SYSTEM WITH A CURSOR FROM A REMOTE SYSTEM

(71) Applicant: DELL PRODUCTS, LP, Round Rock, TX (US)

(72) Inventors: Wei Liu, Austin, TX (US); William A. Moyes, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 171 days.

(21) Appl. No.: 15/211,572

(22) Filed: Jul. 15, 2016

(65) Prior Publication Data

US 2016/0320942 A1 Nov. 3, 2016

Related U.S. Application Data

(63) Continuation of application No. 13/744,978, filed on Jan. 18, 2013, now Pat. No. 9,396,002.

(51) Int. Cl.
| | | |
|---|---|---|
| *G06F 3/0481* | (2013.01) | |
| *G06F 3/14* | (2006.01) | |
| *G06F 9/451* | (2018.01) | |

(52) U.S. Cl.
CPC ........ *G06F 3/04812* (2013.01); *G06F 3/1454* (2013.01); *G06F 9/452* (2018.02)

(58) Field of Classification Search
None
See application file for complete search history.

(56) References Cited

U.S. PATENT DOCUMENTS

| | | |
|---|---|---|
| 7,379,031 B2 | 5/2008 | Emerson et al. |
| 8,209,408 B1 | 6/2012 | Huang et al. |
| 2005/0007344 A1 | 1/2005 | Cook et al. |
| 2005/0104852 A1 | 5/2005 | Emerson et al. |
| 2008/0048975 A1* | 2/2008 | Leibow .......... G06F 3/023 345/156 |
| 2010/0031325 A1 | 2/2010 | Maigne et al. |
| 2010/0060571 A1 | 3/2010 | Chen et al. |
| 2011/0276625 A1 | 11/2011 | Shah |
| 2012/0011193 A1 | 1/2012 | Gilboa |

* cited by examiner

*Primary Examiner* — Amare Mengistu
*Assistant Examiner* — Sarvesh J Nadkarni
(74) *Attorney, Agent, or Firm* — Larson Newman, LLP (57) ABSTRACT

A method includes receiving reports of the pointing device events occurring on a remote computer at a host computer and performing computations in the host computer based upon the mouse reports. The method includes generating screen images in the host computer based upon the computations, the screen images not containing images of a cursor representing locations pointed to by a pointing device of the host computer. The generated screen images are transmitted to the remote computer. In some embodiments, the reports may be received by a remote console controller. An information handling system includes boot firmware to set a mouse to operate in absolute mode under control of the boot firmware. An information handling system separately transmits to a remote console controller of the information handling system screen images without a cursor and cursor images.

20 Claims, 9 Drawing Sheets

SYNCHRONIZING A CURSOR FROM A MANAGED SYSTEM WITH A CURSOR FROM A REMOTE SYSTEM

CROSS REFERENCE TO RELATED APPLICATION

This application is a continuation of U.S. patent application Ser. No. 13/744,978, entitled "Synchronizing A Cursor from a Managed System with a Cursor from a Remote System," filed on Jan. 18, 2013, the disclosure of which is hereby expressly incorporated by reference in its entirety.

FIELD OF THE DISCLOSURE

This disclosure generally relates to information handling systems, and more particularly relates to synchronizing a cursor from a managed system with a cursor from a remote system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems. In a networking system, a local device, such as a server, may be managed from a remote device, such as a computer. A display on the remote device may include both a cursor indicating a position of a pointing device on the remote device and a cursor representing a position of a physical or virtual pointing device on the local device.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application. The teachings can also be utilized in other applications and with several different types of architectures such as distributed computing architectures, client/server architectures, or middleware server architectures and associated components.

For purposes of this disclosure, an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a PDA, a consumer electronic device, a network server or storage device, a switch router, wireless router, or other network communication device, or any other suitable device and can vary in size, shape, performance, functionality, and price. The information handling system can include memory, one or more processing resources such as a central processing unit (CPU) or hardware or software control logic. Additional components of the information handling system can include one or more storage devices, one or more communications ports for communicating with external devices as well as various input and output (I/O) devices, such as a keyboard, a mouse, and a video display. The information handling system can also include one or more buses operable to transmit communications between the various hardware components.

Figure 1:
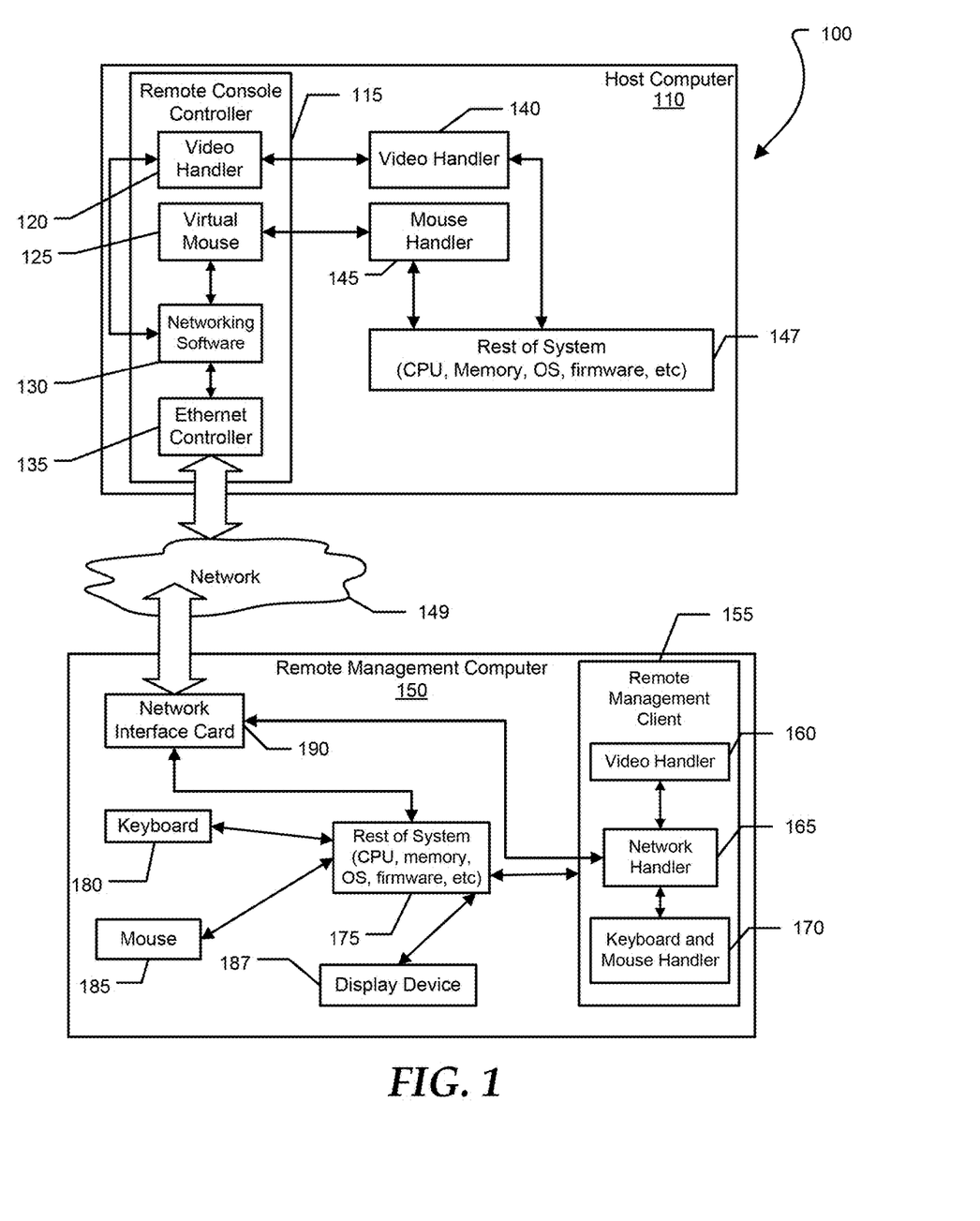
FIG. 1 illustrates a block diagram of a host computer and a remote computer connected over a network, according to one embodiment of the disclosure.

FIG. 1 shows a system 100 that includes host computer 110 and remote management computer 150 connected by a communications network 149, such as the Internet or a private network. Host computer 110 includes remote console controller 115, a variety of other components 147 collectively referred to as Rest of System, video handler 140, and mouse handler 145. Rest of System 147 may include one or more central processing units (CPUs), memory, one or more operating systems (OS), firmware such as Basic Input/Output System (BIOS) or Unified Extensible Firmware Interface (UEFI), and other components. BIOS may be loaded at boot and be in charge of testing the components of a computer, starting it up, and loading an operating system.

UEFI extends the functions of BIOS. In this application, BIOS, UEFI, and other firmware controlling the boot process will be referred to as boot firmware. Remote console controller 115 includes video handler 120, virtual mouse 125, networking software 130, and Ethernet controller 135.

Remote management computer 150 includes remote management client 155, Rest of System 175, keyboard 180, mouse 185, display device 187, and network interface card 190. Remote management client 155 includes video handler 160, network handler 165, and keyboard and mouse handler 170. Rest of System 175 may include one or more central processing units (CPUs), memory, one or more operating systems (OS), firmware such as BIOS or UEFI, and other components.

In system 100, a user operating at remote management computer 150 may control the operation of host computer 110 through the use of remote management client 155. Through the user interface provided by keyboard 180, mouse 185, and display device 187, the user may enter commands that are transmitted over network 149 to host computer 110. In particular, user interactions with mouse 185 of remote management computer 150 may be processed by remote management computer 150, sent over network 149 to host computer 115, and further processed there. In addition, remote management client may enable the display of screen images generated on host computer 115 on display device 187 of remote management computer 150. This display may enable the user to monitor the operation of host computer 110 from remote management computer 150.

In some embodiments, the user interactions may include moving mouse 185 and depressing buttons of mouse 185. In response to these interactions, mouse 185 may generate signals to represent the interactions. These signals may be processed by Rest of System 175. In some embodiments, a mouse microcontroller, mouse device handler, and an operating system of Rest of System 175 may process the signals from mouse 185. In further embodiments, the signals may be translated into mouse events. A mouse may report location by two distinct methods. In relative mode, a mouse may report the change in x and y coordinates since the last report. In absolute mode, a mouse may report the current x and y coordinates.

Rest of System 175 may transmit the processed mouse signals, such as reports of mouse events, to keyboard and mouse handler 170 of remote management client 155. Keyboard and mouse handler 170 of remote management client 155 may process the reports of mouse and keyboard events, and send the processed reports to network handler 165. Network handler 165 may place the reports in a suitable format for transmission over a network and transmit them to network interface card 190. From there, the reports may be sent to remote console controller 115 of host computer 110 over network 149. In many embodiments, keystrokes entered into keyboard 180 of remote management computer 150 may be transmitted over network 149 to host computer 110.

Rest of System 175 may also generate screen images based upon the processing undergone at remote management computer 150, including processing based upon the keyboard and mouse input. These screen images may be displayed on display device 187, and may include a cursor icon representing the location pointed to by mouse 185. This is the location indicated on display device 187 that will respond to mouse or keyboard input. When the location is in a text file, text will be entered there. When the location is at an icon, clicking on the mouse may open an application represented by the icon. When remote management computer 150 is engaged in managing the operation of host computer 110, the screen images may include images generated by the operation of host computer 110. These screen images may include a cursor representing a location pointed to by a pointing device of host computer 110. The images may enable an operator at remote management computer 150 to control the operation of host computer 110.

Remote console controller 115 enables the control of host computer 110 from a remote computer, such as remote management computer 150. In some embodiments, remote console controller 115 may be hardware based. It may, for example, contain multiple built-in hardware components on a single chip. In particular, video handler 120 may be a chip or other physical component to process video. Examples of remote console controllers include the Dell™ Integrated Dell Remote Access Controller (iDRAC™), Fujitsu's remote management card iRMC, HP integrated Lights-Out (iLO), Sun integration Lights Out Management (ILOM), and IBM Remote Supervisor Adapter II (RSA II). In some embodiments, remote console controller 115 may interface with a baseboard management controller (BMC) on host computer 110. The BMC may be a chip embedded in host computer 110 that monitors and reports operating information, including the power state of the server, temperatures inside the server, and hardware error conditions, such as broken fans.

In host computer 110, Ethernet controller 135 provides an interface between remote console 115 and network 149. It receives packets over a network and sends them to networking software 130. Remote console controller 115 may be capable of operating out-of-band (OOB); that is, without the operation of an operating system in host computer 110. Because of its networking components, Ethernet controller 135 and networking software 130, it may be able to communicate over a network even without the intervention of an operating system of host computer 110.

The communications received by Ethernet controller 135 may include mouse and keyboard reports received from remote management client 155. Networking software 130 may extract the content in a suitable format and pass the content to virtual mouse 125. A virtual mouse is a component of an information handling system that may emulate a physical mouse or other pointing device attached to the system. Virtual mouse 125 may receive reports of mouse events from remote management computer 150 and transmit them to mouse handler 145. The transmitted reports may follow the same protocols as reports from an actual physical mouse. In some embodiments of FIG. 1, virtual mouse 125 may be a physical component of remote console controller 115. In other embodiments, virtual mouse 125 may be a software component. In many embodiments, virtual mouse 125 may be capable of operating in either relative mode or absolute mode. In further embodiments, virtual mouse 125 may operate in absolute mode even though it receives reports in relative mode. It may, for example, keep track of the current position of its cursor and increment the current position with the changes in x- and y-coordinates obtained from the relative mode reports to generate an updated current position. It may then report the x and y coordinates of the current position.

In some embodiments, host computer 110 may include pointing devices other than virtual mouse 125. UEFI, BIOS, or OS may permit several physical pointing devices to be plugged into a computer. The pointing devices may include a physical mouse, a track ball, a touch pad, or other pointing devices. These other pointing devices may also transmit reports to mouse handler 145. The reports may describe events generated by a user interaction with the pointing device, such as pointing to a location of a display device or depressing a button. These events will be referred to as pointing device events. The UEFI, BIOS, or OS may determine that one of the pointing devices is active and display a cursor representing the location pointed to by the active device on a screen image.

Mouse handler 145 may process the reports of mouse events from virtual mouse 125. Mouse handler 145 may include a mouse driver or drivers. Rest of System 147 may receive the mouse reports from mouse handler 145 and perform computations based upon the report. For example, a mouse report of clicking on the location of an icon may cause a window to open. The computations may include calculations of screen images to represent the results of processing the mouse events. The screen image data may include a cursor indicating a location of a pointing device on host computer 110.

This screen image data is transmitted to video handler 140 for processing. The results are transmitted to video handler 120 of remote console controller 115 for further processing. They may also be transmitted to an input/output (I/O) interface for output to a display device host computer 110. Video handler 120 may transmit the processed screen image data over network 149 to remote management computer 150 via networking software 130 and Ethernet controller 135. The screen image data may be received by network interface card 190 and processed by remote management computer 150. The processing may include processing by video handler 160 of remote management client 160 and processing by Rest of System 175. Eventually, screen images produced from the screen image data may be displayed on display device 187.

Figure 2:
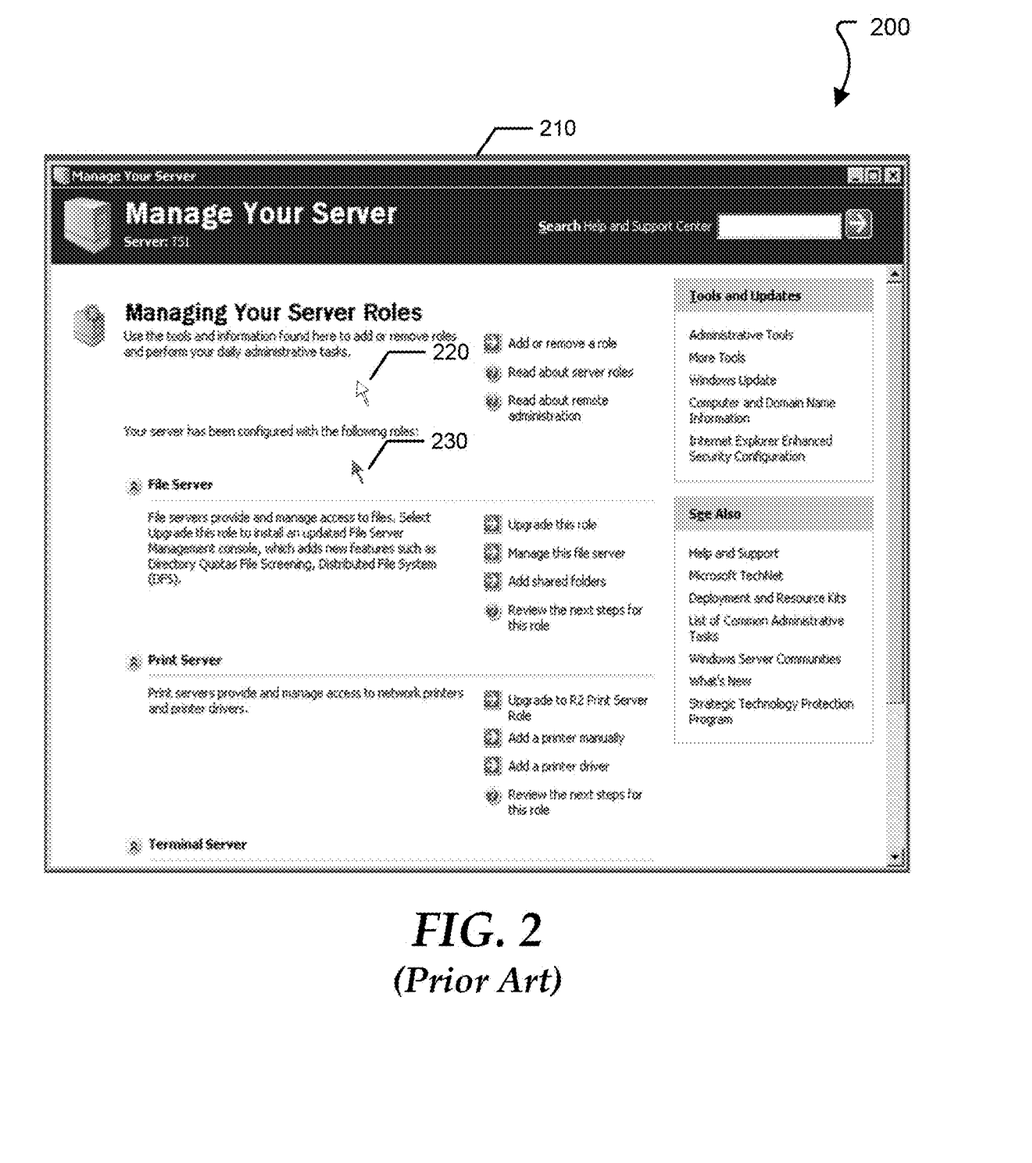
FIG. 2 illustrates a diagram of a prior art screen image from a remote computer.

Thus, when a user at remote management computer 150 is engaged in managing the operation of host computer 110, screen images displayed on display device 187 may include a cursor representing a location of the virtual mouse of host computer 110. In addition, the screen images may include a cursor representing a location of mouse 185. As a result, if the two cursors are not synchronized, the display at display device 187 may include two cursors. FIG. 2 illustrates a screen image 200 showing the results of a prior art display. Screen image 200 is generated on a host computer and displayed on a remote computer. Screen image 200 includes window 210. Window 210 includes cursor 220 and cursor 230. Cursor 220 may represent a location of a pointing device on a remote computer and cursor 230 may represent a location of a pointing device on a host computer.

There may be multiple causes of this duplication of cursor images when operating a computer remotely. A user at the remote computer may, for example, move the mouse outside of a window representing the local computer from one side and re-enters the display from the opposite side of the window. The reports of relative motion sent from the remote computer to the local computer may omit the large displacement that occurred outside of the window. In addition, the translation of movement to position may differ among different operating systems and different boot firmware, such as BIOS or UEFI. For example, the translation may not be linear. When a mouse is moving fast, the distances reported as traveled may be more than linearly greater than the distances reported as traveled when it is moving slower. This non-proportionality may differ among different mice. Further, this translation may be affected by network latency. As a result of the latency, the local computer may determine that the mouse is moving slowly and translate the reported changes in x and y coordinates to smaller increments of distance than the remote computer.

Figure 3:
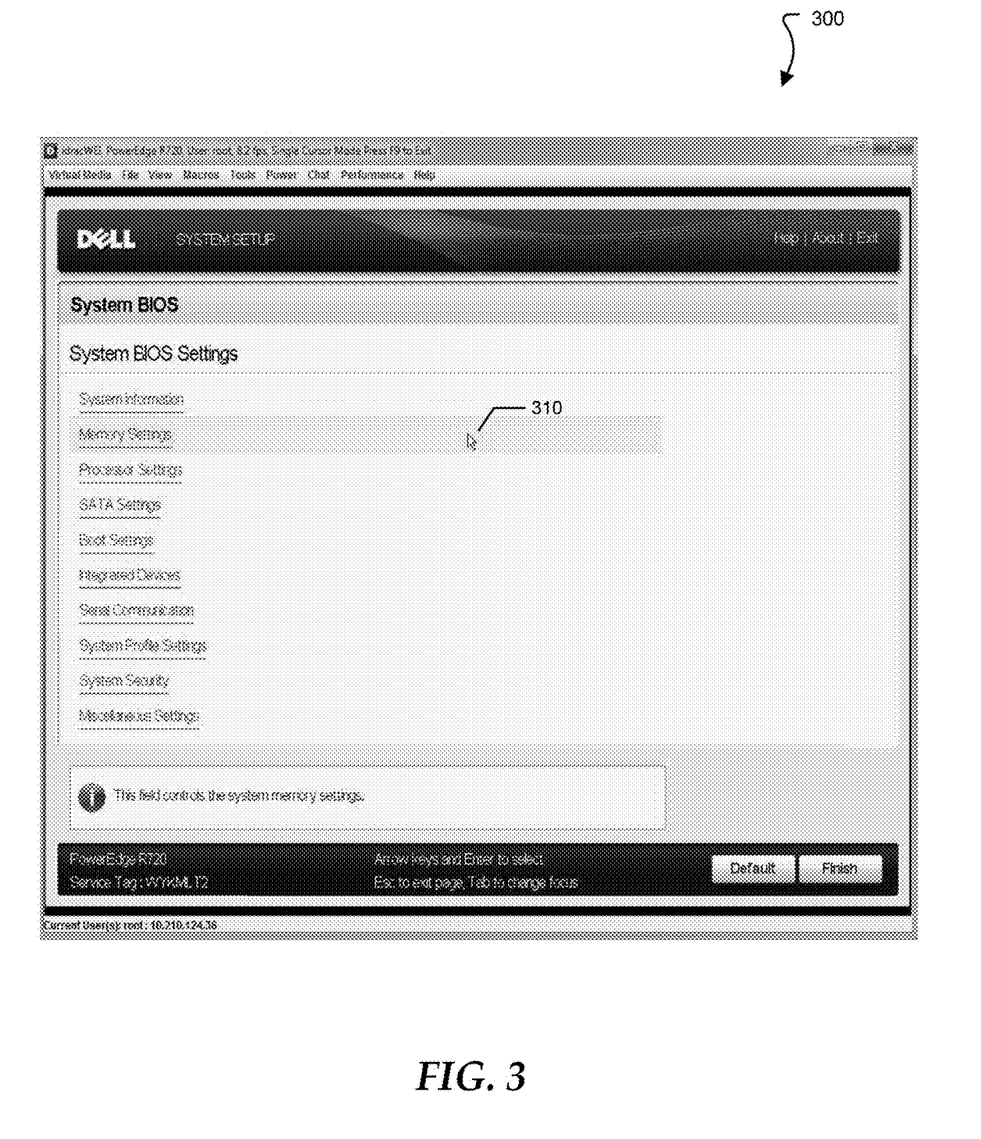
FIG. 3 illustrates a diagram of a screen image from a remote computer according to one embodiment of the disclosure.

In contrast to prior art, in system 100 of FIG. 1, the display of cursors is synchronized. An example display is shown in FIG. 3. Window 300 represents a display on a remote computer of the processing on a host computer. Window 300 includes cursor 310. As can be seen, there is a single cursor in window 300.

System 100 can synchronize the cursor from host computer 110 and the cursor from remote management computer 150 by multiple methods. In one approach, the cursor image generated on host computer 110 and transmitted to remote management computer 150 can be overlaid with the cursor generated on remote management computer 150. In some embodiments, the user at remote management computer 150 may see only the top cursor. In another approach, one or another of the cursors can be hidden. The cursor from host computer 110 may be hidden either before transmission to remote management computer 150 or afterwards. If hidden before, it may be hidden by firmware, by an operating system, or by remote console controller 115. If hidden after transmission to remote management computer 150, the cursor from host computer 110 may be hidden by remote management client 155 or by an operating system of remote management computer 150.

Similarly, if the cursor from remote management computer 150 is hidden, it may be hidden by remote management client 155 or by an operating system of remote management computer 150. The hiding may be done by suppressing the generation of the image of the cursor or by creating a cursor image that is invisible when overlaid with the rest of an image of a screen. Suppressing the generation of the cursor image includes generating a screen image that does not contain the cursor image. In many embodiments, the generation of a screen image may be performed by generating the image apart from the cursor and overlaying an image of the cursor. The suppression may be accomplished by withholding the overlaying of the cursor image. The discussion of FIGS. 4A and 4B will provide more detail about techniques for hiding the image of the cursor from host computer 110.

Figure 4A:
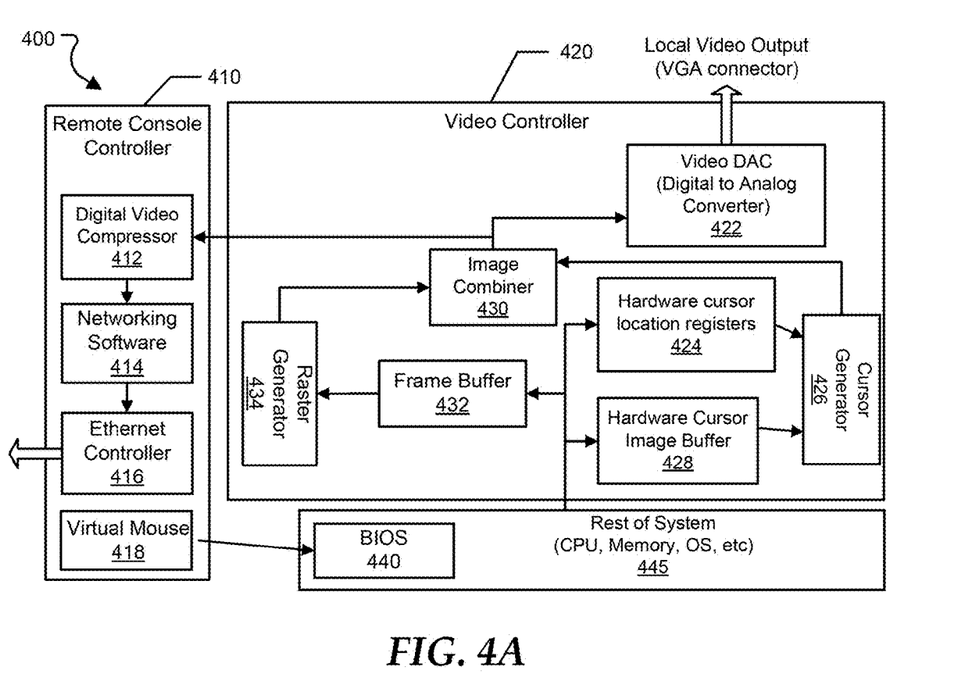
FIG. 4A illustrates a block diagram of a host computer according to one embodiment of the disclosure.

FIG. 4A shows computer 400 which includes remote console controller 410, video controller 420, and Rest of System 445. Computer 400 may be similar to host computer 110 of FIG. 1. It may be connected over a network to a remote computer and controlled from the remote computer by means of remote console controller 410. Remote console controller 410 contains digital video compressor 412, networking software 414, Ethernet controller 416, and virtual mouse 418. Remote console controller 410 may be similar to remote console controller 115 of FIG. 1. Rest of System 445 includes basic input/output system (BIOS) 440. Rest of System 445 may be similar to Rest of System 147 of FIG. 1. Video controller 420 includes video digital to analog converter (DAC) 422, hardware cursor location registers 424, cursor generator 426, hardware cursor image buffer 428, image combiner 430, frame buffer 432, and raster generator 434. DAC 422 may convert digital representations of screen images into analog images for display on a display device such as a monitor. Hardware cursor location registers 424 may store the current location of the cursor of the currently-active pointing device of computer 400. Hardware cursor image buffer 428 may store an image or images of a cursor of computer 450. It may store different cursors which represent different possible user interactions through a pointing device. A cursor may appear as an arrow to indicate movement over an inactive window, but may change to an I-beam shape over an active text document to indicate where text will be inserted. Cursor generator 426 may generate the current image of the cursor in the current location.

Frame buffer 432 may store screen images generated by the operation of computer 400. In many embodiments, the screen images may be stored as pixels. Frame buffer 432 may be composed of random-access memory (RAM). Raster generator 434 may receive data representing the screen images and may rasterize it or convert it to pixels for display on a display device. The rasterization process may involve ordering pixels from frame buffer 432 in the order in which they will be displayed on the display device. Image combiner 430 may combine the rasterized screen images received from raster generator 434 and the cursor image received from 426 to produce a screen image containing an image of a cursor.

The cursor displayed may represent the location pointed to by virtual mouse 418, which in turn may represent the location of a mouse pointer on a remote computer controlling computer 400. Virtual mouse 418 may receive mouse reports from a remote computer through Ethernet controller 416 and networking software 414 and may transmit mouse reports to BIOS 440 or other components of Rest of System 445. Rest of System 445 may generate data for the production of screen images based upon inputs to computer 400. The screen images may include a cursor. In the embodiment of FIG. 4A, the cursor image may be generated separately from the rest of the screen image.

Computer 400 may cause the synchronization of the display of its cursor on a remote computer controlling it with the display of the cursor of the remote computer. In many embodiments, it may suppress the drawing of the cursor representing the location pointed to by virtual mouse 418. In further embodiments, the suppression may be implemented by setting virtual mouse 418 to operate in absolute mode and suppressing the drawing of the cursor when the active pointing device is operating in absolute mode.

Virtual mouse 418 may be capable of operating in either absolute or relative mode and may be set to operate in absolute mode when computer 400 is being remotely managed. This setting may be performed by a component of Rest of System 445, such as BIOS 440 during boot or by an operating system. In addition, the component may be adapted to handle absolute mouse reports. In some embodiments of FIG. 4A, BIOS 440 is adapted to handle absolute mouse reports. This adaptation may, for example, extend to the setup engine of BIOS 440. The setup engine is a graphical user interface (GUI) to enable a user to configure BIOS settings.

In addition, Rest of System 445 may suppress the drawing of a cursor when the active pointing device is acting is absolute mode. This suppression may include suppression both in screen images transmitted back to a remote computer and to screen images displayed on a local display device. As a result, on the remote computer, only one cursor is displayed, the cursor of a pointing device of the remote computer. The cursor display may always be up to date and fast-acting, since it will not be affected by network lag.

When the active pointing device is operating in relative mode, however, Rest of System 445 may enable the display of the cursor. As a result, if a local operator is using computer 400, the cursor image may be included in the display on a display device of computer 400. A cursor display is often useful for a pointing device operating in relative mode, since otherwise a user may not know what area of the screen is responding to input. Thus, many mice operate only in relative mode. In contrast, a cursor display may not be needed for some pointing devices which operate in absolute mode, such as tablets or pads. On these devices, the user knows that the area of the screen being touched is active.

In other embodiments, an operating system of Rest of System 445 may include a software driver that communicates directly with remote console controller 410 and makes the decision as to if it should display or suppress the local mouse cursor. In further embodiments, this driver may set virtual mouse 418 to absolute mode when it is being remotely controlled.

Figure 4B:
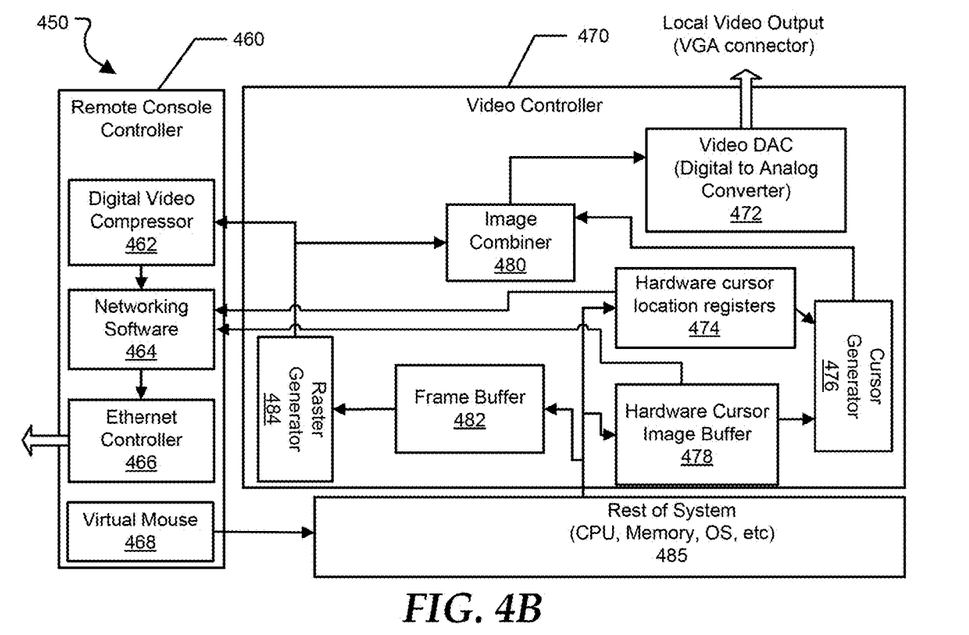
FIG. 4B illustrates a block diagram of a host computer according to another embodiment of the disclosure.

FIG. 4B shows computer 450 which includes remote console controller 460, video controller 470, and Rest of System 485. Computer 450 may be similar to computer 400 of FIG. 4A. It may be connected over a network to a remote computer and controlled from the remote computer by means of remote console controller 460. Remote console controller 460 contains digital video compressor 462, networking software 464, Ethernet controller 466, and virtual mouse 468. Video controller 470 includes video DAC 472, hardware cursor location registers 474, cursor generator 476, hardware cursor image buffer 478, image combiner 480, frame buffer 482, and raster generator 484. DAC 472 may convert digital representations of screen images into analog images for display on a display device such as a monitor. Hardware cursor location registers 474 may store the current location of the cursor of the currently-active pointing device of computer 450. Hardware cursor image buffer 478 may store an image or images of a cursor of computer 450. It may store different cursors which represent different possible user interactions through a pointing device. Cursor generator 476 may generate the current image of the cursor in the current location.

Frame buffer 482 may store screen images generated by the operation of computer 450. In many embodiments, the screen images may be stored as pixels. Frame buffer 482 may be composed of random-access memory (RAM). Raster generator 484 may receive data representing the screen images and may rasterize it for display on a display device. Image combiner may combine the rasterized screen images received from raster generator 484 and the cursor image received from 476 to produce a screen image containing an image of a cursor.

The cursor displayed may represent the location pointed to by virtual mouse 468, which in turn may represent the location of a mouse pointer on a remote computer controlling computer 450. Virtual mouse 468 may receive mouse reports from a remote computer through Ethernet controller 466 and networking software 464 and may transmit mouse reports to Rest of System 485. Rest of System 485 may generate data for the production of screen images based upon inputs to computer 450. The screen images may include a cursor. In the embodiment of FIG. 4B, the cursor image may be generated separately from the rest of the screen image.

Computer 450 may separate the cursor image from the rest of the screen image when sending it to remote console controller 460. In computer 450, unlike in computer 400 of FIG. 4A, the rasterized pixels are transmitted directly to digital video compressor 460. They are not first sent to image combiner 480. In addition, the location and image of the cursor are sent to networking software 464 from hardware cursor location registers 474 and hardware cursor image buffer 478, respectively. The rasterized pixels and cursor image data may be sent separately over Ethernet controller 416 to a remote computer, such as remote management computer 150 of FIG. 1, which is controlling the operation of computer 450.

In some embodiments, components of the remote computer may then suppress the display of the cursor of computer 450 by displaying the rasterized pixels without combining them with the cursor data. The suppression may be performed by a remote management client such as remote management client 155 of FIG. 1, by an operating system active on the remote computer, or by some other component of the remote computer. In other embodiments, the suppression may be performed at computer 450. Computer 450 may omit sending remote console controller 460 data about the location and image of the cursor, or remote console controller 460 may omit transmitting the cursor image data to a remote computer.

The transmission of both the cursor data and the rasterized pixels enables the remote computer to display the cursor from computer 450 as desired. A user at the remote computer may, for example, move the pointing device of that computer outside of a window representing the remote management client software. The remote computer may then display the remote cursor in the current location pointed to by its pointing device, and display the cursor from computer 450 in a window representing the remote management client software. In addition, the remote computer may display the cursor received from computer 450 in the location for display of the remote cursor, substituting that image for the image of the cursor of the remote computer.

In other embodiments, data about the cursor image and location may be sent to a digital video compressor instead of bypassing it. In some embodiments, a cursor generator may send the cursor image to a digital video compressor or networking software of a remote console controller instead of the location and image being sent separately.

Figure 5:
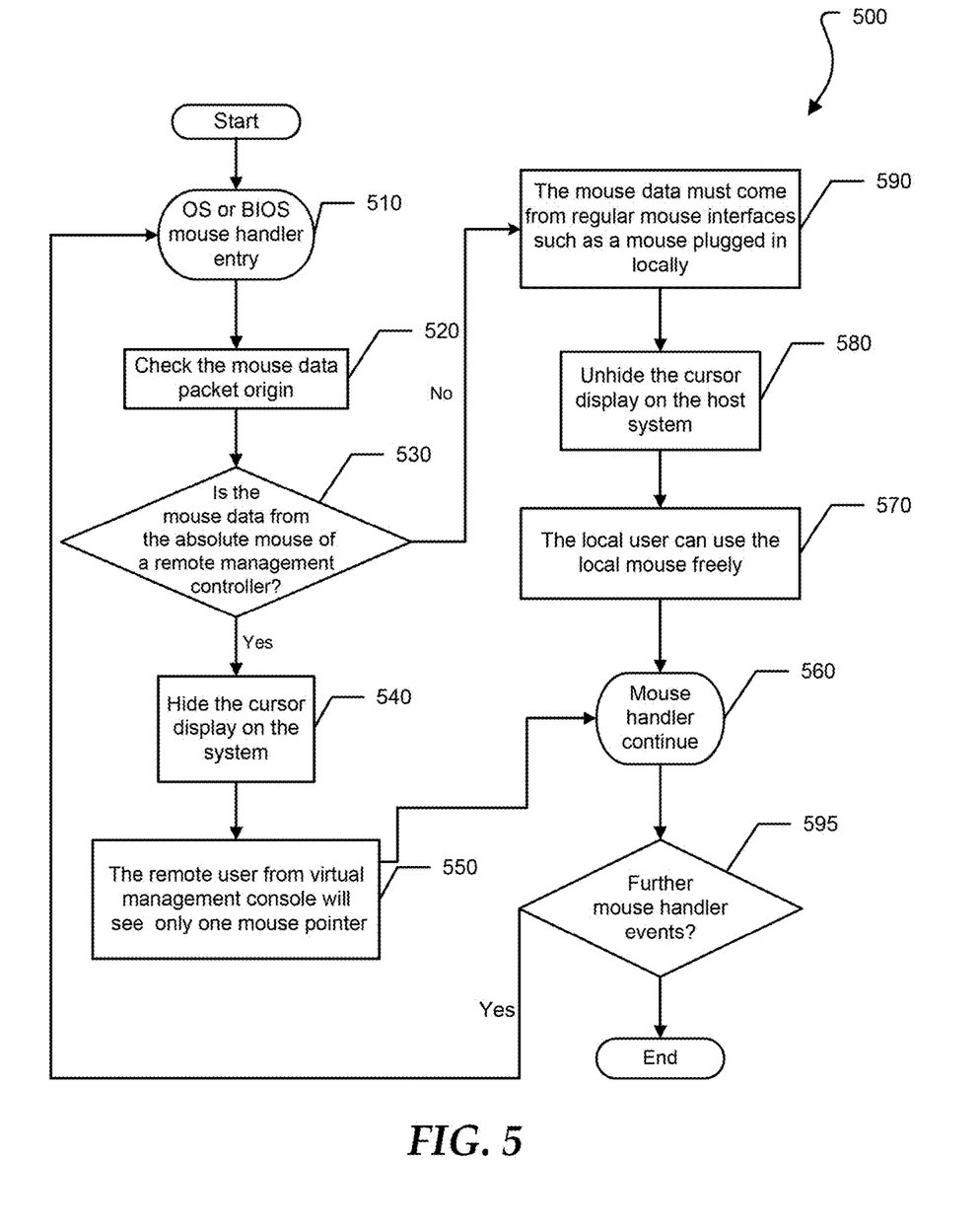
FIG. 5 is a flow diagram illustrating a method according to one embodiment of the disclosure.

FIG. 5 shows a flow diagram 500 that begins with an OS or BIOS mouse handler entry at block 510. The entry may consist of a packet of mouse data, such as information about the location of a mouse or information about clicking or depressing mouse buttons. The entry may be to a mouse handler of a host system that is remotely managed, such as mouse handler 145 of host computer 110 of FIG. 1. At block 520, the origin of the mouse data packet is determined. At block 530, if the origin was from an absolute mouse of a remote console controller, such as remote console controller 460 of FIG. 4B, flow proceeds to block 540. Otherwise, flow proceeds to block 590.

At block 540, the cursor display on the host system is hidden. The hiding may be performed by boot firmware during boot or by an operating system after boot. A screen image of the host system, omitting the cursor, may be transmitted to a remote computer controlling the host system. As a result, at block 550, a user at a virtual management console, such as a virtual console displayed on remote management computer 150 of FIG. 1 by remote management client software 155, may see only one mouse pointer—the mouse pointer from the remote computer. Its performance and feel may be exactly the same as the mouse pointer from the remote computer display on other applications on the remote computer. Further, unless the cursor is replaced by a cursor image sent from the host system, the cursor image may be exactly the same when the user is operating the remote management application as when the user is operating other applications on the remote computer.

At block 590, the mouse data must have arrived from a regular mouse interface such as a mouse plugged in locally to the host system and operated by a local user. At block 580, the host system enables cursor display on its screen images. At block 570, the local user freely uses the local mouse and can view the cursor on the screen display. At block 560, the mouse handler awaits further mouse events. If, at block 595, there are further mouse events, the flow of FIG. 5 returns to block 510. Otherwise, the flow ends.

Figure 6:
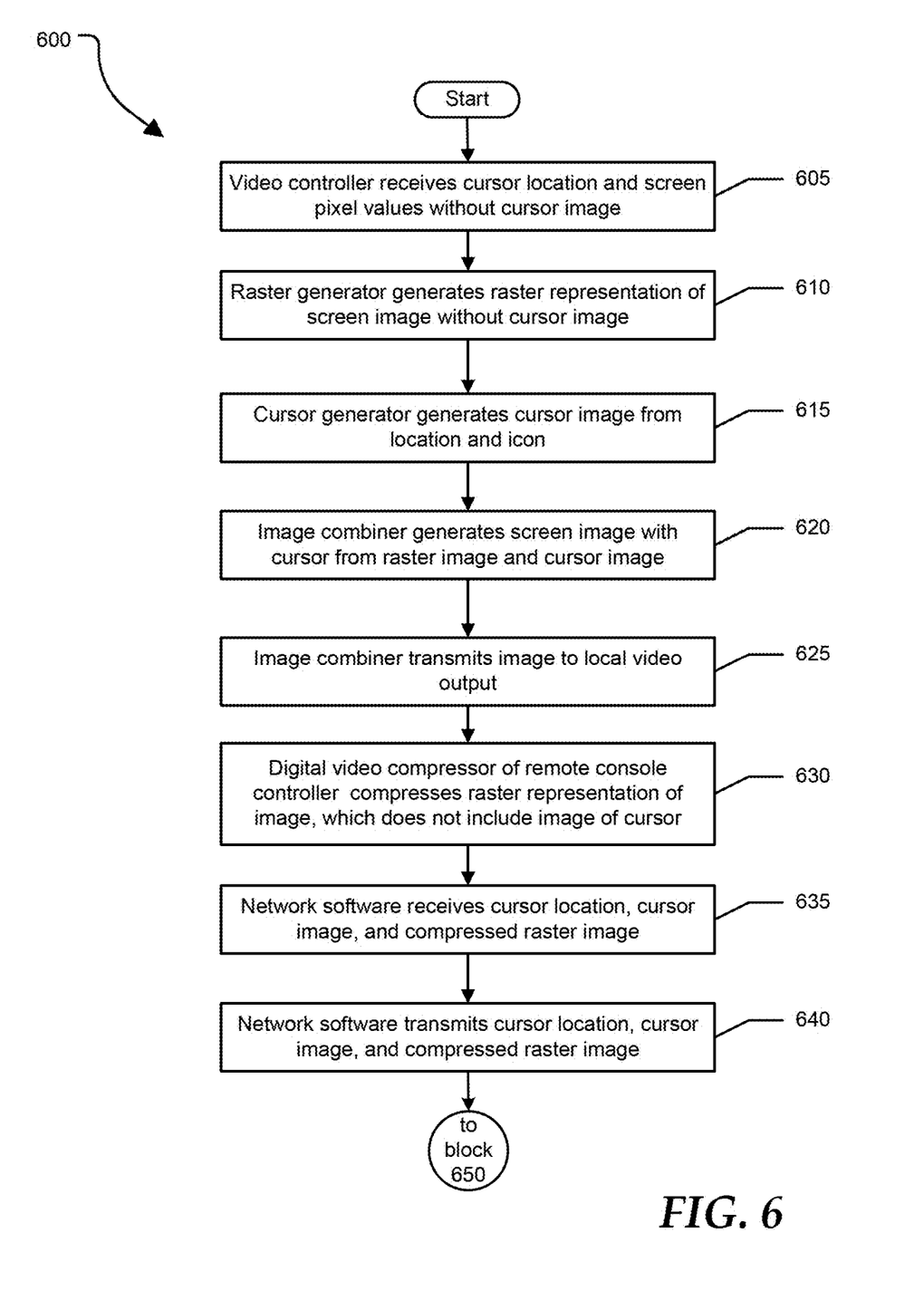
FIG. 6 is a is a flow diagram illustrating a method according to another embodiment of the disclosure.

FIG. 6 shows a flow diagram 600 that begins at block 605 with a video controller of a host computer receiving screen pixel values and a cursor location. The screen pixel values do not contain a cursor image. The video controller may be similar to video controller 470 of FIG. 4B. At block 610, a raster generator, such as raster generator 484 of FIG. 4B, generates raster representations of screen images without the cursor image. At block 615, a cursor generator, such as cursor generator 476 of FIG. 4B, receives data about the location and image of the cursor and generates an image of the cursor at its location on a screen of the host computer. The cursor generator may simply overlay the cursor image at the proper location on a blank screen image.

At block 620, an image combiner, such as image combiner 480 of FIG. 4B, generates a screen image containing the cursor by combining the raster representation, which did not contain the cursor, and the cursor image properly located, which was received from the cursor generator. At block 625, the image combiner transmits the screen image to the local video output for display on a video display of the host computer.

At block 630, a digital video compressor of a remote console controller, such as remote console controller 460 of FIG. 4B, receives the raster representations of screen images. These representations do not contain an image of the cursor. The digital video compressor compresses the images for transmission to a remote computer controlling the operation of the host computer. At block 635, network software of the remote console controller receives data about the cursor image and location for transmission to the remote computer. At block 640, the network software transmits the cursor location, the cursor image, and the compressed raster image to the remote computer.

At block 650, the remote computer receives the cursor location, the cursor image, and the compressed raster image of the screen of the local computer from the local computer. At block 660, an image of the local cursor is inserted in the local screen image in the position of the remote cursor. The remote cursor location may, for example, be within a window generated by the local computer and displayed on the remote computer in a window of a virtual console for managing the local computer. Instead of displaying the remote cursor image at that location, the remote computer may display the image of the cursor of the local computer. The remote computer may thereby emulate the display seen on the local computer. At block 670, the screen images sent from the local computer are displayed on the remote computer. In addition, the remote cursor is replaced in the display by the local cursor.

Figure 7:
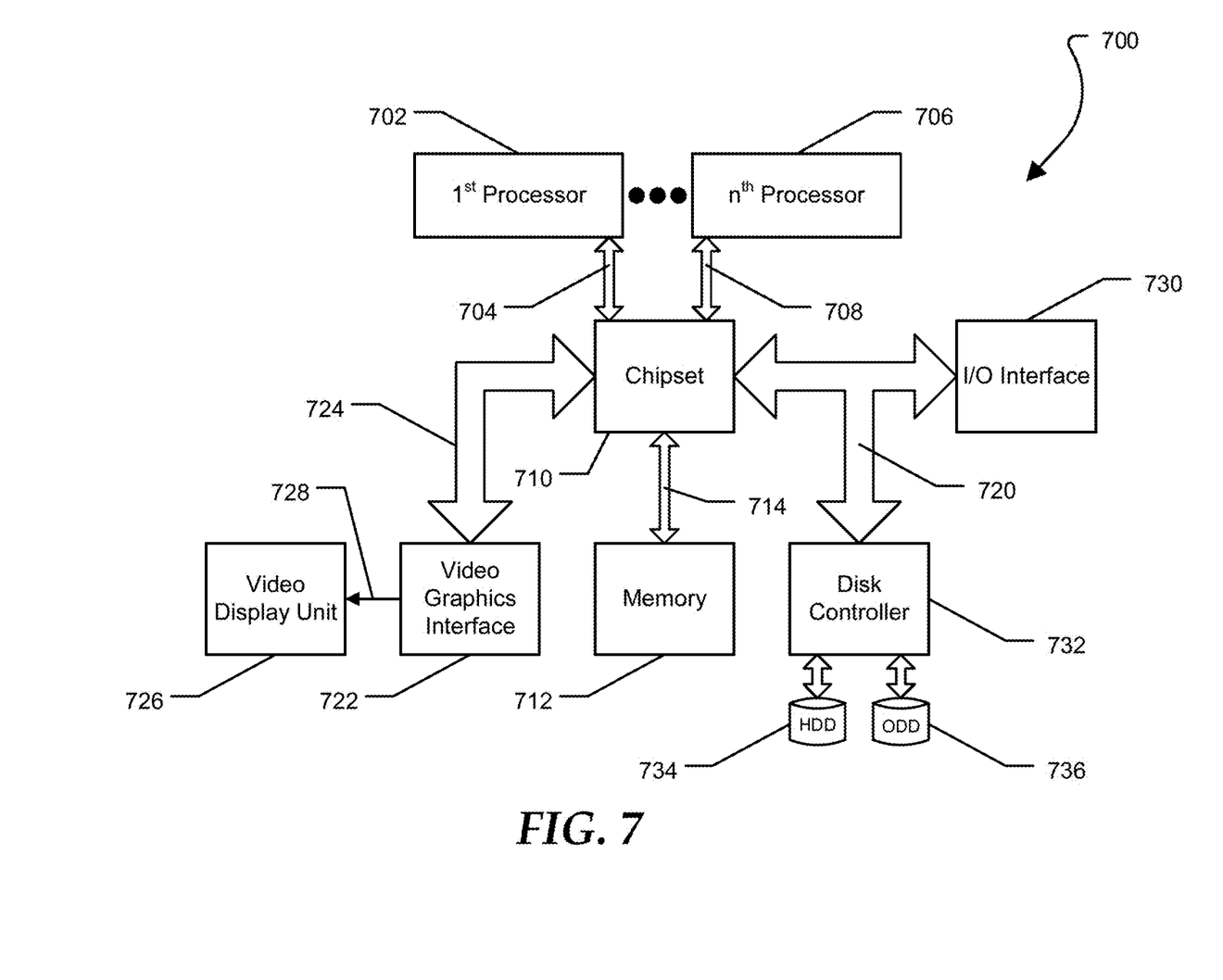
FIG. 7 illustrates a block diagram of an information handling system according to one embodiment of the disclosure.

FIG. 7 illustrates a block diagram of an exemplary embodiment of an information handling system, generally designated at 700. In one form, the information handling system 700 can be a computer system such as a server. As shown in FIG. 7, the information handling system 700 can include a first physical processor 702 coupled to a first host bus 704 and can further include additional processors generally designated as $n^{th}$ physical processor 706 coupled to a second host bus 708. The first physical processor 702 can be coupled to a chipset 710 via the first host bus 704. Further, the $n^{th}$ physical processor 706 can be coupled to the chipset 710 via the second host bus 708. The chipset 710 can support multiple processors and can allow for simultaneous processing of multiple processors and support the exchange of information within information handling system 700 during multiple processing operations.

According to one aspect, the chipset 710 can be referred to as a memory hub or a memory controller. For example, the chipset 710 can include an Accelerated Hub Architecture (AHA) that uses a dedicated bus to transfer data between first physical processor 702 and the $n^{th}$ physical processor 706. For example, the chipset 710, including an AHA enabled-chipset, can include a memory controller hub and an input/output (I/O) controller hub. As a memory controller hub, the chipset 710 can function to provide access to first physical processor 702 using first bus 704 and $n^{th}$ physical processor 706 using the second host bus 708. The chipset 710 can also provide a memory interface for accessing memory 712 using a memory bus 714. In a particular embodiment, the buses 704, 708, and 714 can be individual buses or part of the same bus. The chipset 710 can also provide bus control and can handle transfers between the buses 704, 708, and 714.

According to another aspect, the chipset 710 can be generally considered an application specific chipset that provides connectivity to various buses, and integrates other system functions. For example, the chipset 710 can be provided using an Intel® Hub Architecture (IHA) chipset that can also include two parts, a Graphics and AGP Memory Controller Hub (GMCH) and an I/O Controller Hub (ICH). For example, an Intel 820E, an 815E chipset, or any combination thereof, available from the Intel Corporation of Santa Clara, Calif., can provide at least a portion of the chipset 710. The chipset 710 can also be packaged as an application specific integrated circuit (ASIC).

The information handling system 700 can also include a video graphics interface 722 that can be coupled to the chipset 710 using a third host bus 724. In one form, the video graphics interface 722 can be a Peripheral Component Interconnect (PCI) Express interface to display content within a video display unit 726. Other graphics interfaces may also be used. The video graphics interface 722 can provide a video display output 728 to the video display unit 726. The video display unit 726 can include one or more types of video displays such as a flat panel display (FPD) or other type of display device.

The information handling system 700 can also include an I/O interface 730 that can be connected via an I/O bus 720 to the chipset 710. The I/O interface 730 and I/O bus 720 can include industry standard buses or proprietary buses and respective interfaces or controllers. For example, the I/O bus 720 can also include a PCI bus or a high speed PCI-Express bus. In one embodiment, a PCI bus can be operated at approximately 66 MHz and a PCI-Express bus can be operated at approximately 728 MHz. PCI buses and PCI-Express buses can be provided to comply with industry standards for connecting and communicating between various PCI-enabled hardware devices. Other buses can also be provided in association with, or independent of, the I/O bus 720 including, but not limited to, industry standard buses or proprietary buses, such as Industry Standard Architecture (ISA), Small Computer Serial Interface (SCSI), Inter-Integrated Circuit ($I^2C$), System Packet Interface (SPI), or Universal Serial buses (USBs).

In an alternate embodiment, the chipset 710 can be a chipset employing a Northbridge/Southbridge chipset configuration (not illustrated). For example, a Northbridge portion of the chipset 710 can communicate with the first physical processor 702 and can control interaction with the memory 712, the I/O bus 720 that can be operable as a PCI bus, and activities for the video graphics interface 722. The Northbridge portion can also communicate with the first physical processor 702 using first bus 704 and the second bus 708 coupled to the $n^{th}$ physical processor 706. The chipset 710 can also include a Southbridge portion (not illustrated) of the chipset 710 and can handle I/O functions of the chipset 710. The Southbridge portion can manage the basic forms of I/O such as Universal Serial Bus (USB), serial I/O, audio outputs, Integrated Drive Electronics (IDE), and ISA I/O for the information handling system 700.

The information handling system 700 can further include a disk controller 732 coupled to the I/O bus 720, and connecting one or more internal disk drives such as a hard disk drive (HDD) 734 and an optical disk drive (ODD) 736 such as a Read/Write Compact Disk (R/W CD), a Read/Write Digital Video Disk (R/W DVD), a Read/Write mini-Digital Video Disk (R/W mini-DVD), or other type of optical disk drive.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:

receiving at a host computer first reports from a remote computer of pointing device events occurring on the remote computer;

performing computations in the host computer based upon the first reports, the computations including determining locations pointed to by a pointing device of the host computer based upon the first reports, wherein the pointing device is active on the host computer and an operating system of the host computer determines the locations;

setting the pointing device in absolute mode when the pointing device is being remotely controlled, wherein the operating system of the host computer sets the active pointing device of the host computer in the absolute mode;

suppressing generation of images of a cursor in response to the setting of the pointing device in the absolute mode, wherein the suppressing generation of the images is performed by boot firmware during a boot operation and by the operating system after the boot operation, wherein the suppressing the generation of the images of the cursor includes generating screen images in the host computer based upon the computations and based on the pointing device of the host computer being in the absolute mode, wherein the screen images do not contain the images of the cursor representing the locations pointed to by the pointing device and the operating system generates the screen images in the host computer based upon the computations;

transmitting the screen images generated in the host computer to a remote console controller of the host computer;

transmitting the screen images from the remote console controller of the host computer to the remote computer for display;

transmitting the images of the cursor representing the locations pointed to by the pointing device from the host computer to the remote computer; and replacing an image of a cursor of the remote computer on a screen image of the remote computer with an image of the images of the cursor of the host computer.

2. The method of claim 1, further comprising transmitting the images of the cursor representing the locations pointed to by the pointing device to the remote console controller separately from the transmission of the screen images.

3. The method of claim 2, wherein the transmitting the screen images comprises the remote console controller suppressing the images of the cursor in the transmitting the screen images to the remote computer.

4. The method of claim 2, further comprising:
the remote console controller transmitting the images of the cursor to the remote computer; and
the remote computer suppressing the images of the cursor in displaying the screen images from the host computer on a display device of the remote computer.

5. The method of claim 2, wherein the receiving the first reports comprises the receiving the first reports by a virtual mouse of the remote console controller.

6. The method of claim 1, wherein the setting comprises setting a virtual mouse of the remote console controller of the host computer in the absolute mode.

7. The method of claim 1, wherein the setting comprises setting the pointing device of the host computer in the absolute mode based upon determining that the host computer is remotely managed by the remote computer.

8. The method of claim 1, wherein the receiving the first reports comprises receiving the first reports of the pointing device events out-of-band.

9. The method of claim 1, further comprising suppressing display of the cursor representing the locations pointed to by the pointing device on a display device of the host computer.

10. An information handling system comprising:
system firmware and software to receive reports of events of pointing devices of the information handling system and to perform computations based upon the reports, the computations including determining locations pointed to by the pointing devices of the information handling system, wherein the pointing devices are active on the information handling system and the system firmware and software determine the locations, and wherein the system firmware and software set the pointing devices in absolute mode;
a video controller to suppress generation of images of cursors when the pointing devices are in the absolute mode after a boot operation and by boot firmware during the boot operation, including to generate screen images based upon the computations and based upon the active pointing devices of the information handling system being in the absolute mode, wherein the screen images do not contain the images of the cursors representing the locations pointed to by the pointing devices and to separately generate the images of the cursors, based upon the reports originating from a remote computer; and
a remote console controller to receive commands from the remote computer for management of the information handling system, to receive from the video controller the screen images and to separately receive from the video controller the images of the cursor, to transmit the screen images from the information handling system to the remote computer, to receive the images of the cursors representing locations pointed to by the pointing device from a host computer, and to replace an image of a cursor of the remote computer on a screen image of the remote computer with an image of the images of the cursors of the host computer.

11. The information handling system of claim 10, wherein the remote console controller is to transmit the images of the cursors to the remote computer and the remote computer is to suppress the images of the cursors in displaying the screen images from the information handling system.

12. The information handling system of claim 10, wherein:
the remote console controller includes a virtual mouse to receive mouse reports from the remote computer and to transmit the mouse reports to the system firmware and software; and
the video controller is to generate a cursor representing the locations pointed to by the virtual mouse separately from the screen images.

13. The information handling system of claim 10, wherein:
the video controller comprises hardware, the hardware including:
a frame buffer to hold the screen images;
a cursor generator to generate the images of the cursors; and
a combiner to combine the screen images and the images of the cursors; and
the remote console controller including:
video compression hardware to receive rasterized screen images not containing the cursor; and
networking software to receive the images of the cursors.

14. A method comprising:
receiving at a host computer first reports from a remote computer of pointing device events occurring on the remote computer;
performing computations in the host computer based upon the first reports, the computations including determining locations pointed to by a pointing device of the host computer based upon the first reports, wherein the pointing device is active on the host computer and an operating system of the host computer determines the locations;
setting the pointing device in absolute mode, wherein boot firmware of the host computer sets the active pointing device of the host computer in the absolute mode during a boot operation, and wherein the operating system of the host computer sets the active pointing device of the host computer in the absolute mode after the boot operation;
generating screen images in the host computer based upon the computations and based on the active pointing device of the host computer being in the absolute mode, wherein the screen images omit images of a cursor representing the locations pointed to by the pointing device, wherein the boot firmware generates the screen images during the boot operation and the operating system generates the screen images in the host computer after the boot operation based upon the computations;
rasterizing the generated screen images in the host computer to a remote console controller of the host computer;

transmitting the rasterized screen images generated in the host computer to a remote console controller of the host computer;

transmitting images of a cursor representing the locations pointed to by the pointing device to the remote console controller separately from the transmission of the rasterized screen images;

transmitting the rasterized screen images from the remote console controller of the host computer to the remote computer for display, wherein the transmitting the rasterized screen images comprises the remote console controller suppressing the images of the cursor in the transmitting the screen images to the remote computer;

transmitting the images of the cursor representing the locations pointed to by the pointing device from the host computer to the remote computer;

determining whether the pointing device of the host computer is in the absolute mode; and in response to the determining that the pointing device of the host computer is in the absolute mode, replacing an image of a cursor of the remote computer on a screen image of the remote computer with an image of the images of the cursor of the host computer.

15. The method of claim 14, further comprising:
the remote console controller transmitting the images of the cursor to the remote computer; and
the remote computer suppressing the images of the cursor in displaying the screen images from the host computer on a display device of the remote computer.

16. The method of claim 14, wherein the receiving the first reports comprises receiving the first reports by a virtual mouse of the remote console controller.

17. The method of claim 14, wherein the setting comprises setting a virtual mouse of the remote console controller of the host computer in the absolute mode.

18. The method of claim 14, wherein the setting comprises setting the pointing device of the host computer in the absolute mode based upon determining that the host computer is remotely managed by the remote computer.

19. The method of claim 14, further comprising in response to the determining that the pointing device of the host computer is not in the absolute mode, displaying image of the cursor of the remote computer on the screen image of the remote computer.

20. The method of claim 1, further comprising setting the pointing device in a relative mode when the pointing device is not being remotely controlled, wherein the operating system of the host computer sets the active pointing device of the host computer in the relative mode.

* * * * *